(12) United States Patent
Amaya et al.

(10) Patent No.: US 9,157,686 B2
(45) Date of Patent: Oct. 13, 2015

(54) HEAT EXCHANGER AND METHOD OF PRODUCING THEREOF

(75) Inventors: Luis Amaya, Sölvesborg (SE); Bengt-Ove Birgersson, Sölvesborg (SE)

(73) Assignee: TITANX ENGINE COOLING AB, Solvesborg (SE)

( * ) Notice: Subject to any disclaimer, the term of this patent is extended or adjusted under 35 U.S.C. 154(b) by 1327 days.

(21) Appl. No.: 12/670,595

(22) PCT Filed: Jul. 7, 2008

(86) PCT No.: PCT/SE2008/000432
§ 371 (c)(1),
(2), (4) Date: Mar. 16, 2010

(87) PCT Pub. No.: WO2009/014475
PCT Pub. Date: Jan. 29, 2009

(65) Prior Publication Data
US 2010/0206534 A1      Aug. 19, 2010

(30) Foreign Application Priority Data

Jul. 26, 2007   (SE) ...................................... 0701805

(51) Int. Cl.
*F28D 7/16*         (2006.01)
*F02B 29/04*        (2006.01)
(Continued)

(52) U.S. Cl.
CPC .......... *F28D 7/1692* (2013.01); *F02B 29/0462* (2013.01); *F28F 9/00* (2013.01); *F28F 9/0209* (2013.01); *F28F 2009/029* (2013.01); *Y02T 10/146* (2013.01)

(58) Field of Classification Search
CPC ...... F28D 7/1615; F28D 7/1623; F28F 9/001; F28F 2009/226
USPC ..................... 165/153, 157, 173, 175, 76, 78; 29/890.043, 890.054
See application file for complete search history.

(56) References Cited

U.S. PATENT DOCUMENTS 1,916,549 A  *  7/1933  Young .......................... 165/173
3,669,185 A     6/1972  Bare
(Continued)

FOREIGN PATENT DOCUMENTS

DE      10 2005 05548 A1    5/2007
EP         1 707 911 A1    10/2006
(Continued)

*Primary Examiner* — Leonard R Leo
(74) *Attorney, Agent, or Firm* — Birch, Stewart, Kolasch & Birch, LLP

(57) ABSTRACT

The invention concerns a heat exchanger and a method of producing thereof. The heat exchanger comprises a coolant housing with two opposing wide side walls and two header plates of an inlet air tank and an outlet air tank, respectively. The header plates are channel-shaped with longitudinal flanges extending over and being brazed to the wide side walls. Tubes extend in parallel through said housing between the two header plates, said tubes being brazed to apertures in said header plates. The coolant housing has two opposing narrow side walls tightly fitting said wide side walls and said header plates and defining together with these wide side walls and header plates a first coolant tank and a second coolant tank opposing the first one. Each air tank comprises a cowling tightly fitting and being brazed to one of said header plates each and having an air inlet and an air outlet, respectively. At least one of said two side walls is welded to said wide side walls and said header plates thus enclosing said housing.

21 Claims, 4 Drawing Sheets

(51) Int. Cl.
*F28F 9/00* (2006.01)
*F28F 9/02* (2006.01)

(56) References Cited

U.S. PATENT DOCUMENTS

| | | | |
|---|---|---|---|
| 3,863,713 A | 2/1975 | Tramontini | |
| 4,877,083 A * | 10/1989 | Saperstein | 165/176 |
| 5,390,733 A * | 2/1995 | Young | 165/173 |
| 5,555,930 A * | 9/1996 | Lu | 165/149 |
| 5,816,320 A * | 10/1998 | Arnold et al. | 165/153 |
| 6,374,911 B1 * | 4/2002 | Olson et al. | 165/173 |
| 6,446,711 B1 * | 9/2002 | DeGroot et al. | 165/149 |
| 6,749,015 B2 * | 6/2004 | Moreau | 165/175 |
| 7,077,190 B2 * | 7/2006 | Hayashi et al. | 165/159 |
| 7,172,016 B2 * | 2/2007 | Meshenky et al. | 165/173 |
| 7,195,060 B2 * | 3/2007 | Martin et al. | 165/157 |
| 7,204,302 B2 * | 4/2007 | Shibagaki et al. | 165/158 |
| 8,002,022 B2 * | 8/2011 | Geskes | 165/158 |
| 8,069,905 B2 * | 12/2011 | Goto | 165/157 |
| 2003/0010480 A1 | 1/2003 | Shibagaki et al. | |
| 2003/0070793 A1 * | 4/2003 | Dierbeck | 165/145 |
| 2006/0048759 A1 | 3/2006 | Hendrix et al. | |
| 2008/0223562 A1 | 9/2008 | Braic et al. | |
| 2008/0271722 A1 | 11/2008 | Grunenwald et al. | |

FOREIGN PATENT DOCUMENTS

| | | | | |
|---|---|---|---|---|
| FR | 2 843 059 A1 | | 2/2004 | |
| JP | 04032692 A | * | 2/1992 | 165/159 |
| JP | 04032694 A | * | 2/1992 | 165/159 |
| JP | 04208391 A | * | 7/1992 | F28D 1/053 |
| JP | 06265290 A | * | 9/1994 | F28F 3/08 |
| JP | 2000-8971 A | | 1/2000 | |
| WO | WO-2007/031274 A1 | | 3/2007 | |

* cited by examiner

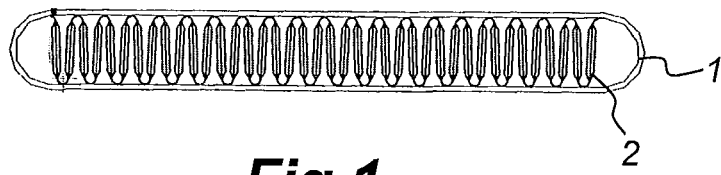
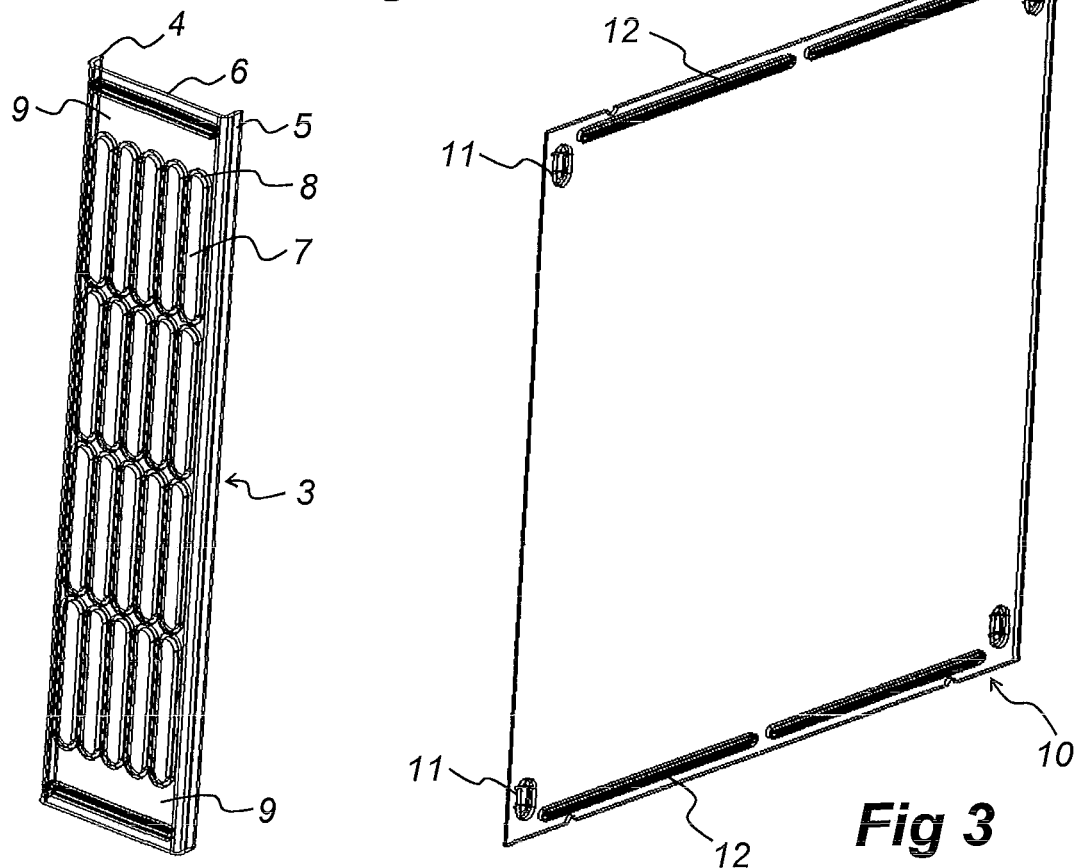
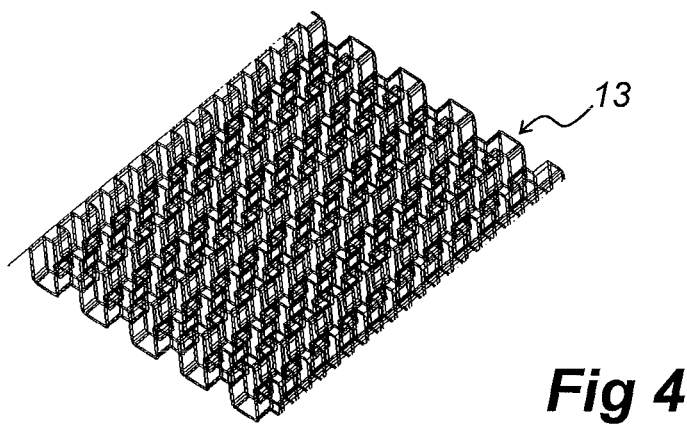

HEAT EXCHANGER AND METHOD OF PRODUCING THEREOF

TECHNICAL FIELD

The present invention relates to a heat exchanger, such as water cooled charge air cooler for a turbocharged or supercharged combustion engine, as well as to a method of producing such a heat exchanger.

PRIOR ART

The prior art document EP 1 707 911 A1 discloses a heat exchanger according to the introduction comprising a coolant housing having a coolant inlet and a coolant outlet, said coolant housing being of rectangular parallelepipedic shape with two opposing wide side walls and two opposing narrow side walls, the narrow side walls tightly fitting and being brazed to the wide side walls, air tubes extending in parallel through said housing between the two narrow side walls, the narrow side walls forming header plates of an inlet air tank and an outlet air tank, respectively, the air tubes tightly fitting and being brazed to apertures in said header plates.

The known heat exchanger shows only a minor air pressure drop over its air tubes extending in parallel through the heat exchanger housing thanks to an advantageous heat exchanger design clearly differing from other prior art solutions where instead coolant tubes are extending in parallel through air casings. It is however obvious that the known heat exchanger is primarily designed only for light turbo- or supercharging of combustion engines. This can be derived from the fact that the embodiment described has air tank cowlings made of plastics, which is not a material suitable for temperatures of such magnitude as encountered in heavy turbo- or supercharging. Further the method used to fasten the air tank cowlings to the coolant housing is mechanical bending of tabs of header plates over said cowlings, which means a third method of fastening besides brazing and welding applied to other parts of the heat exchanger and also means that there is a gasket needed in order to achieve air tightness.

Besides air tightness, coolant tightness is a main issue of heat exchangers for turbo- or supercharging of combustion engines, because coolant leakage into the air intake of a combustion engine can lead to severe engine damage. The prior art heat exchanger according to EP 1 707 911 A1 pays attention to this by forming of a coolant housing totally enclosed by brazing and welding before the final mechanical bending action takes place. The material mix of both sheet metal and plastics does however render even a minor water leakage repair quite difficult, because even such a minor repair causes welding heat, which could endanger the integrity of the plastics material.

OBJECT OF THE INVENTION

In view of the above the object of the invention is to eliminate the drawbacks of the previously known heat exchangers and to propose a novel heat exchanger which is easy to manufacture, can withstand high temperatures and is easy to repair.

SUMMARY OF THE INVENTION

According to the invention this is achieved by means of a heat exchanger comprising a coolant housing with two opposing wide side walls and two header plates of an inlet air tank and an outlet air tank, respectively, being brazed to the wide side walls, tubes extending in parallel through said housing between the two header plates, the tubes being brazed to apertures in said header plates, wherein said coolant housing has two opposing narrow side walls tightly fitting said wide side walls and said header plates and defining together with these wide side walls and header plates a first coolant tank and a second coolant tank opposing the first one, wherein each air tank comprises a cowling tightly fitting and being brazed to one of said header plates each and having an air inlet and an air outlet, respectively, and wherein at least one of said two side walls is welded to said wide side walls and said header plates thus enclosing said housing.

By brazing the air tank cowlings as well according to the invention a brazed unit is accomplished in a very simple way comprising both air tanks and the major part of the coolant housing. The brazed unit can be checked for tightness, and only if there is tightness the coolant housing is enclosed by welding of at least one remaining side wall to it. The heat exchanger thus enclosed is totally made of heat enduring material, the material being weldable should a minor repair be needed.

Preferably the heat exchanger has header plates which are channel-shaped with longitudinal flanges extending over and being brazed to the wide side walls. Header plates of that kind are easy to accomplish, e.g. by means of a aluminium section material, and provide accurate support for said wide side walls while brazing the parts together.

Preferably the cowlings have side flanges extending over and being brazed to the longitudinal flanges of the header plates, said side flanges covering only a minor part of the longitudinal flanges of the header plates thus leaving the joint between the longitudinal flanges and the wide side walls accessible for inspection or repair. Again side flanges render brazing more easy, and it is obvious that more narrow side flanges than the ones of the header plates underneath render inspection for coolant leakage and repair thereof possible in a most favourable way.

According to a preferred embodiment the cowlings have flattened areas between their side flanges next to the ends thereof, the flattened areas corresponding to non-apertured parts of the header plates, onto which parts said areas are brazed. Cowlings of this kind do render brazing more easy and constitute an easy way to ensure air tightness without need of any gaskets.

The air tubes are flat tubes preferably have narrow long sides facing a main coolant flow direction through the coolant housing and being arranged in at least three parallel groups of at least three air tubes each in said main coolant flow direction, the groups having widths essentially corresponding to a diameter of said air inlet. A heat exchanger having a design showing these parameters has the shape of a very narrow unit, which is easy to install close to an engine air intake without interfering with other part in the engine compartment. Adjustment in size to larger engines is easy to accomplish either by lengthening of the air tubes, by widening of the groups of air tubes to a larger number and/or by adding of additional groups of air tubes on top.

According to a first optional embodiment the first coolant tank has a coolant inlet and a coolant outlet, the first coolant tank between the coolant inlet and the coolant outlet being divided into a coolant inlet part and a coolant outlet part by means of a baffle directing the coolant flow from said coolant inlet part along corrugated turbulators to said second coolant tank, from where the coolant flow follows the corrugated turbulators to said coolant outlet part. This optional embodiment leads to a very compact heat exchanger having both its coolant inlet and its coolant outlet on the same coolant tank, which in most cases simplifies installation.

According to a second optional embodiment the first coolant tank has a coolant inlet and a coolant outlet, the first coolant tank between the coolant input and the coolant output being divided into a coolant inlet part, a second coolant deviation part and a coolant outlet part and the second coolant tank being divided into a first coolant deviation part and a third coolant deviation part by means of three baffles, the first baffle in the first coolant tank directing the coolant flow from said coolant inlet part along corrugated turbulators to said first coolant deviation part, the second baffle in the second coolant tank directing the coolant flow along the corrugated turbulators to said second coolant deviation part, and the third baffle in the first coolant tank directing the coolant flow along the corrugated turbulators to said third coolant deviation part, from where the coolant flow follows the corrugated turbulators to said coolant outlet part. The second optional embodiment also leads to a very compact heat exchanger having both its coolant inlet and its coolant outlet on the same coolant tank, which in most cases simplifies installation. Further it makes very good use of the cooling capacity of the coolant by letting the coolant pass the air tubes repeatedly.

Preferably the sheet material of the corrugated parts of the turbulators has an embossed offset pattern enhancing turbulent flow of the coolant. Said pattern serves to enhancing coolant-turbulator interaction and thus to improve heat exchange.

According to a preferred embodiment the header plate and cowling flanges form a close fitment holding the brazable heat exchanger parts assembled while being brazed, which obviously is a great advantage productionwise.

According to the invention there is provided too a method of producing a heat exchanger according to the above, said heat exchanger comprising a coolant housing. The method comprises the steps of assembling all of the brazable parts to a unit held together either by means of a fixture frame or by close fitment of the parts involved, brazing of said unit by heating thereof in a furnace, removing of the fixture frame, if at hand, and welding of at least one side wall to said unit in order to enclose said coolant housing.

The method according to invention is an very easy one, because it comprises only two fastening steps, a first brazing one and a second welding one. This simplifies production a great deal and has the extra advantage of avoiding welding of defective brazed units, which later on would have to be to scraped after all. Further it is obvious that the method according to the invention has the extra advantage of having to fix the brazable parts only once before brazing, either by means of a fixture frame or by close fitment of the parts involved.

SHORT DESCRIPTION OF THE DRAWINGS

In the drawings a preferred embodiment of the invention is shown, wherein:

FIG. 1 shows an air tube with an internal turbulator inside in an end view;

FIG. 2 shows a header plate in a perspective view;

FIG. 3 shows a wide side wall or cover plate in a perspective view;

FIG. 4 shows an external turbulator in a perspective view;

DESCRIPTION OF A PREFERRED EMBODIMENT

Figure 5:
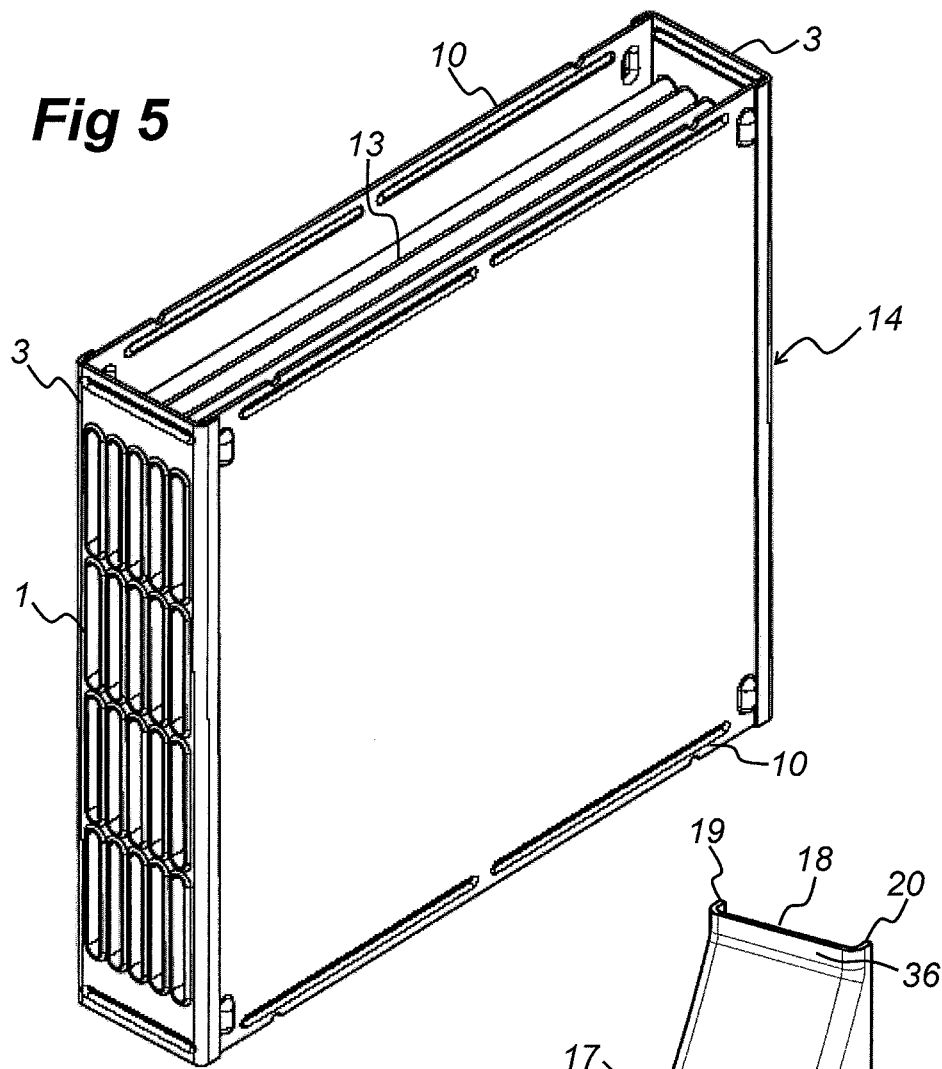
FIG. 5 shows a preassembled heat exchanger core comprising header plates, cover plates, air tubes and external turbulators in a perspective view.

In the drawings FIG. 1 shows an air tube 1 with an internal turbulator 2 inside. The air tube 1 is made of a clad aluminium sheet in order to be brazable and has been shaped into an oblong section before being electrowelded along a longitudinal pipe seam. Inside the air tube 1 there is an internal turbulator 2, which is made of an aluminium sheet and has been corrugated lengthwise before being stuffed inside the air tube 1.

The header plate 3 shown in FIG. 2 is made of a sectional element of clad aluminium in order to be brazable too. It has two opposing flanges 4, 5 along its longitudinal edges and a flat central part 6 in-between. In the central part 6 there are stamped oblong holes 7 exactly fitting the air tubes 1. The stamping results in rims 8 protruding from the flat central part 6 in order to support the air tubes 1. The rims 8 can protrude on either side of the flat central part 6 of the header plate 3, although protrusion as shown on the side facing away from the flanges 4, 5 is preferred.

The cover plate 10 shown in FIG. 3 is made of a clad aluminium sheet in order to be brazable. It is of rectangular shape and has beads 11 stamped therein at its four corners as well as ribs 12 extending along an opposing top and bottom edge. The beads 11 and ribs 12 are to render assembly more easy, which will be described later on.

In FIG. 4 a part of an external turbulator 13 is shown, the external turbulator 13 too being made of clad aluminium sheet material. The external turbulator 13 is corrugated and has a so called offset pattern on it in order to enhance turbulant coolant flow. The external turbulator 13 and its corrugation and offset pattern will be describe in more detail in connection with the detail view of FIG. 9.

FIG. 5 shows a preassembled heat exchanger core 14 comprising two header plates 3, two cover plates 10, twenty air tubes 1 and external turbulators 13 between these tubes 1 and between the tubes 1 and the cover plates 10. The preassembled heat exchanger core 14 has not been brazed yet, i.e. it must be held together in a convenient way by some sort of frame (not shown) or by close fitment of the parts involved, the beads 11 mentioned above serving as positive stops for the header plate flanges 4, 5.

Figure 6:
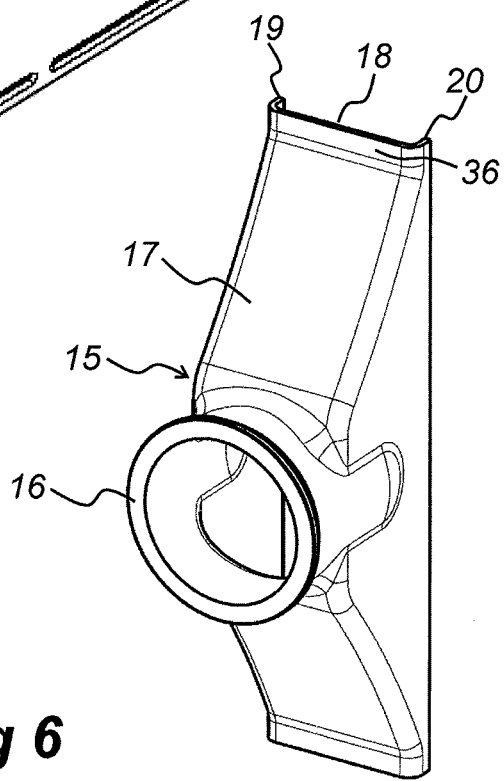
FIG. 6 shows an air tank cowling in a perspective view.
Figure 10:
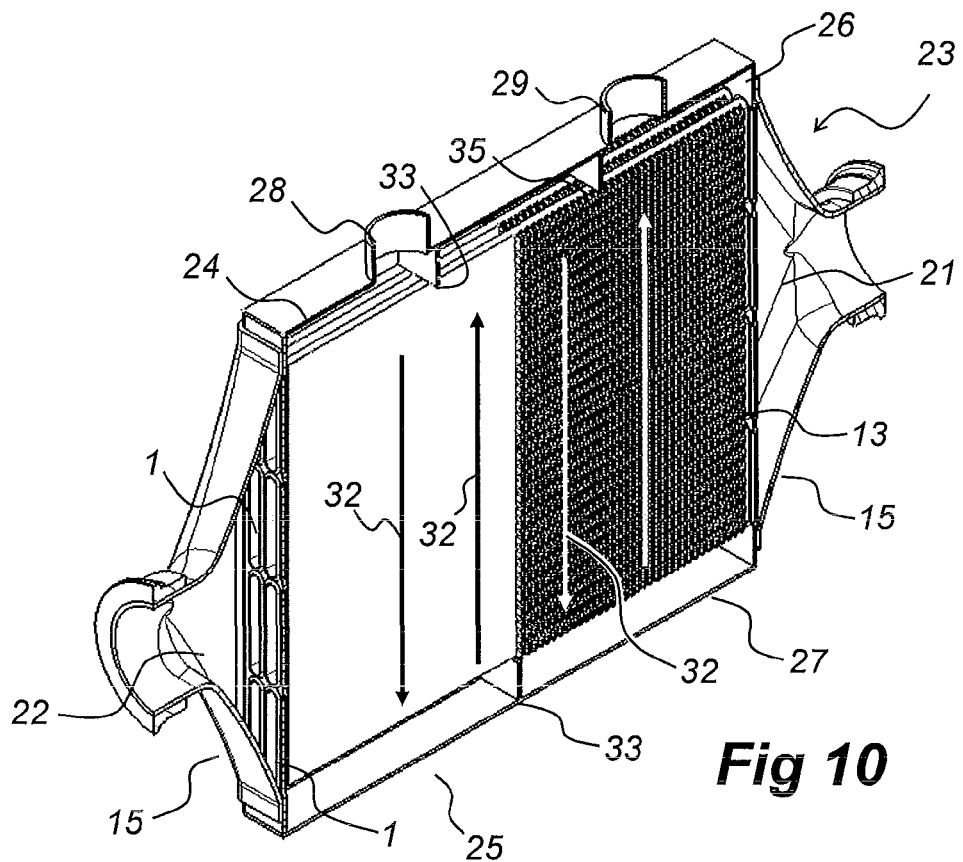
FIG. 10 shows an example of a coolant passage through a heat exchanger according to the preferred embodiment in a perspective view.

In FIG. 6 an air tank cowling 15 is shown being made of a brazable clad aluminium sheet material. It is a stamped part having an air inlet or outlet 16 of circular shape and a hopper shaped portion 17 connected thereto. The hopper shaped portion 17 opens into a channel 18 exactly fitting over the header plate flanges 4, 5 with flanges 19, 20 of its own, although not as wide as the header plate flanges 4, 5. The purpose of that will be described later on. The hopper channel 18 has opposing end portions also exactly fitting to parts of a header plate 3, more precisely flattened areas 36 fitting the flat end portions 9 of the central part 6 of the header plate 3 beyond the oblong holes 7, in order to form an air inlet and an air outlet tank 21, 22 (c.f. FIG. 10). Both the cowling flanges 19, 20 and the flattened areas 36 are to be tightly brazed to the corresponding header plate parts, to which end the cowlings 15 are mounted to the heat exchanger core assembly 14 of FIG. 5 and held in place by said frame or close fitment.

Figure 7:
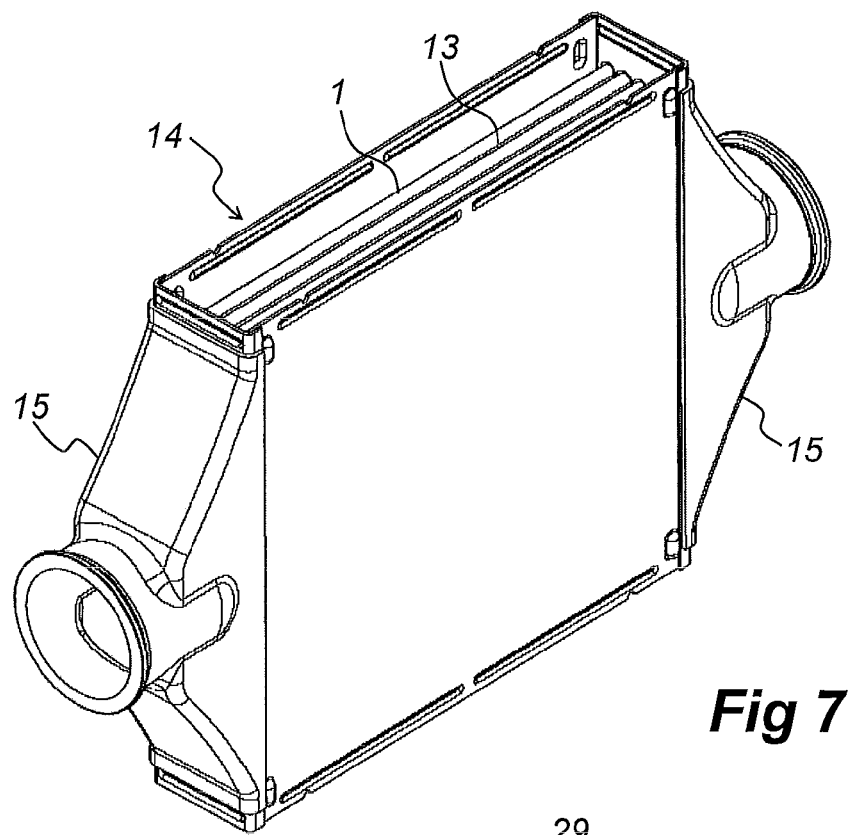
FIG. 7 shows the heat exchanger core in a perspective view in a brazed state comprising air tank cowlings as well.

In FIG. 7 the heat exchanger core 14 is shown in a final brazed state with the air tank cowlings 15 fitted thereto. The brazing is performed preferably in a one shot process in a brazing furnace, one shot meaning that all of the brazing, i.e. even the brazing of the turbulators 2, 13 inside of and outside of the air tubes 1, is performed in just one staying time in the furnace. After brazing the heat exchanger core 14 with the cowlings 15 is checked for air tightness. Should there be a leakage, it is scraped and not subjected to the final process step, which is welding.

Figure 8:
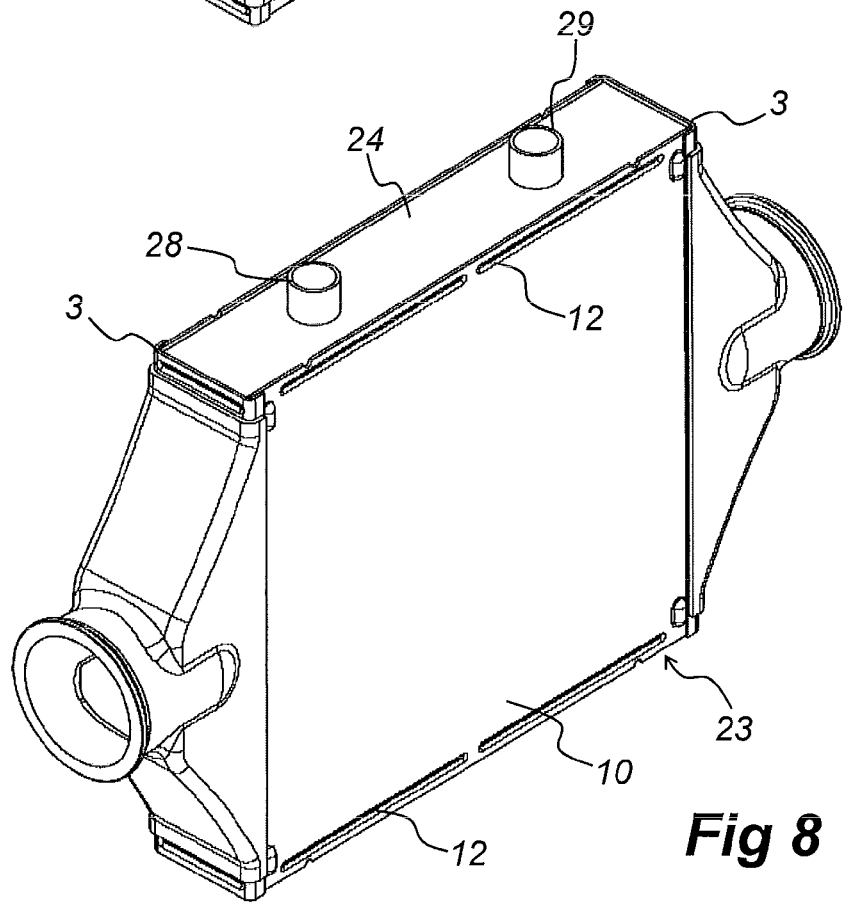
FIG. 8 shows the completed heat exchanger in a perspective view with a narrow side wall or cover plate welded to the top and the bottom thereof.
Figure 11:
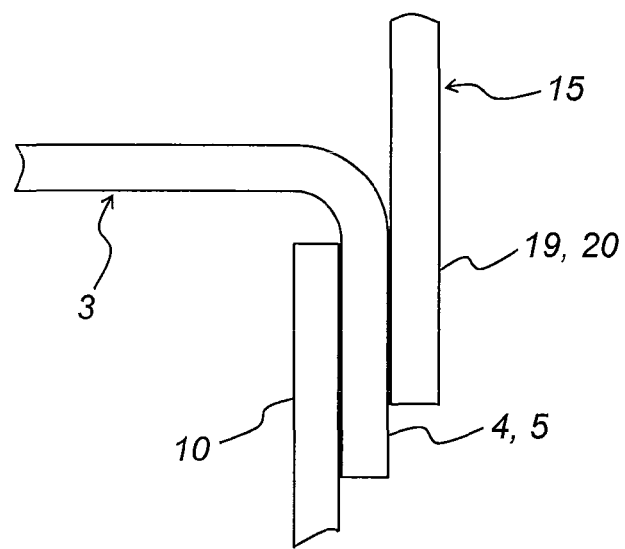
FIG. 11 shows a detail of a joint between a cover plate, a header plate and an air cowling in a sectional view.

In FIG. 8 a completed heat exchanger 23 is shown having both a top and a bottom cover plate 24, 25 (c.f. FIG. 11) welded thereto. The top and bottom cover plates 24, 25 are made of aluminium sheet material and have a size fitting inside and enclosing a top and a bottom water tank 26, 27 (c.f. FIG. 10) formed by the side cover plates 10 and the header plates 3 on top of and under the air tubes 1. The top cover plate 24 has a coolant inlet and outlet 28, 29 and abuts against the ribs 12 at the top of the side cover plates 10. The bottom cover plate 25 is all flat and abuts against the ribs 12 at the bottom of the side cover plates 10 (abutment against corresponding ribs on the cover plates 3 being possible too). In the positions given by the abutment the top and the bottom cover plates 24, 25 are finally welded to the heat exchanger 23 thus completed.

Figure 9:
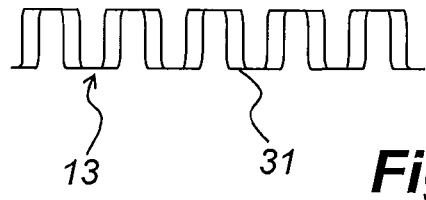
FIG. 9 shows a detail of a corrugated external turbulator in an end view.

In order to further expose some other aspects of the invention in FIGS. 9 to 11 further details of the embodiment described so far are shown.

In FIG. 9 a detail is shown of a corrugated external turbulator 13 to be brazed onto the outside of the air tubes 1 and/or the inside of the cover plates 10. As can be seen the turbulator 13 has been formed by stamping of a metal sheet into a corrugated and additionally offset shape 31. The purpose of the offset shape 31 is to enhance coolant turbulence and thus to improve efficiency.

In FIG. 10 an example of a coolant passage 32 (c.f. the arrows) through a heat exchanger 23 according to the preferred embodiment is shown in a perspective view with parts of external turbulators 13 shown as a flat area in order to enhance clarity. The coolant passage 32 is defined by a way similar to the prior art document cited above by means of offset baffles 33, 34, 35, two 33, 35 in the top coolant tank 26 and one 34 in the bottom coolant tank 27. Thus a coolant flow 32 is created passing the air tubes 1 no less than four times, which is quite favourable in terms of efficiency and lets the coolant flow 32 start and end at one and the same coolant tank 26. It is obvious that even just one baffle in the centre of the top coolant tank 26 would do at least to ensure a coolant flow starting and stopping in the same coolant tank.

Finally in FIG. 11 another detail of the preferred embodiment of the invention is shown. Shown is an enlarged top section view of a joint between a cover plate 10, a header plate 3 and an air cowling 15. As can be seen the cower plate 10 is arranged inside with a flange 4, 5 of the header plate 3 extending over it and being brazed thereto. Outside the header plate flange 4, 5 there is a flange 19, 20 of the air cowling 15 brazed to the header plate 3. The cowling flange 19, 20 however is not as wide as the header plate flange 4, 5, which means that both the brazing seam between the air cowling 15 and the header plate 3 and between the header plate 3 and the cover plate 10 remain visible and to some extent repairable if needed, for instance in a situation where no spare part is available.

It is obvious to a person skilled in the art that the heat exchanger 23 according to the preferred embodiment works in a counter flow manner, i.e. with the air and coolant inlet on opposing sides of the heat exchanger 23. It is obvious too that brazing is rendered more reliable if the parts brazed are pre-fluxed, i.e. coated with flux before they are assembled. This is of course due to the fact that immersion of the preassembled heat exchanger 23 into flux is not likely to result in total wetting of all parts with flux. Finally, the welding process used for welding of the top and the bottom cover plates 24, 25 is preferably of the kind known as CMT, which stands for Cold Metal Transfer and gives rise only to minimum heating and thus does not adversely affect the brazing seams.

The invention claimed is:

1. Heat exchanger comprising:
a leak proof brazed unit comprising:
a coolant housing being of rectangular parallelepipedic shape with two opposing wide side walls and two header plates of an inlet air tank and an outlet air tank, respectively, the header plates being channel-shaped with longitudinal flanges extending over and being brazed to the wide side walls, wherein at least one of the two opposing wide side walls includes ribs respectively extending along a top edge and a bottom edge of said at least one of the two opposing wide side walls,
tubes extending in parallel through said housing between the two header plates,
the tubes being brazed to apertures in said header plates,
wherein each air tank of the brazed unit comprises a cowling tightly fitting and being brazed to one of said header plates each and having an air inlet and an air outlet, respectively,
wherein said coolant housing comprises two opposing narrow side walls tightly fitting said wide side walls and said header plates of said brazed unit and defining together with these wide side walls and header plates a first coolant tank and a second coolant tank opposing the first one, and
wherein at least one of said two narrow side walls tightly fits said coolant housing by being inserted into the brazed unit into abutment against the ribs of said at least one of the two opposing wide side walls and by being welded to said wide side walls and said header plates thus enclosing said housing.

2. Heat exchanger according to claim 1, wherein the cowlings have side flanges extending over and being brazed to the longitudinal flanges of the header plates.

3. Heat exchanger according to claim 2 wherein the side flanges cover only a minor part of the longitudinal flanges of the header plates thus leaving the joint between the longitudinal flanges and the wide side walls accessible for inspection or repair.

4. Heat exchanger according to claim 3, wherein the cowlings have flattened areas between their side flanges next to the ends thereof, the flattened areas corresponding to non-apertured parts of the header plates, onto which parts said flattened areas are brazed.

5. Heat exchanger according to claim 3, wherein the tubes are flat tubes having narrow long sides facing a main coolant flow direction through the coolant housing and being arranged in at least three parallel groups of at least three tubes each in said main coolant flow direction, the groups having widths essentially corresponding to a diameter of said air inlet.

6. Heat exchanger according to claim 3, wherein said first coolant tank has a coolant inlet and a coolant outlet, the first coolant tank between the coolant inlet and the coolant outlet being divided into a coolant inlet part and a coolant outlet part by means of a baffle being arranged to direct the coolant flow from said coolant inlet part along corrugated turbulators to said second coolant tank, from where the coolant flow is to follow the corrugated turbulators to said coolant outlet part.

7. Heat exchanger according to claim 2, wherein the cowlings have flattened areas between their side flanges next to the ends thereof, the flattened areas corresponding to non-apertured parts of the header plates, onto which parts said flattened areas are brazed.

8. Heat exchanger according to claim 7, wherein the tubes are flat tubes having narrow long sides facing a main coolant flow direction through the coolant housing and being arranged in at least three parallel groups of at least three tubes each in said main coolant flow direction, the groups having widths essentially corresponding to a diameter of said air inlet.

9. Heat exchanger according to claim 7, wherein said first coolant tank has a coolant inlet and a coolant outlet, the first coolant tank between the coolant inlet and the coolant outlet being divided into a coolant inlet part and a coolant outlet part by means of a baffle being arranged to direct the coolant flow from said coolant inlet part along corrugated turbulators to said second coolant tank, from where the coolant flow is to follow the corrugated turbulators to said coolant outlet part.

10. Heat exchanger according to claim 2, wherein the tubes are flat tubes having narrow long sides facing a main coolant flow direction through the coolant housing and being arranged in at least three parallel groups of at least three tubes each in said main coolant flow direction, the groups having widths essentially corresponding to a diameter of said air inlet.

11. Heat exchanger according to claim 2, wherein said first coolant tank has a coolant inlet and a coolant outlet, the first coolant tank between the coolant inlet and the coolant outlet being divided into a coolant inlet part and a coolant outlet part by means of a baffle being arranged to direct the coolant flow from said coolant inlet part along corrugated turbulators to said second coolant tank, from where the coolant flow is to follow the corrugated turbulators to said coolant outlet part.

12. Heat exchanger according to claim 2, wherein the longitudinal flanges of the header plates extend over the wide side walls of the coolant housing to form an overlap region, and the side flanges of the cowlings extend over the longitudinal flanges of the header plates, overlapping with part of said overlap region.

13. Heat exchanger according to claim 1, wherein the tubes are flat tubes having narrow long sides facing a main coolant flow direction through the coolant housing and being arranged in at least three parallel groups of at least three tubes each in said main coolant flow direction, the groups having widths essentially corresponding to a diameter of said air inlet.

14. Heat exchanger according to claim 13, wherein said first coolant tank has a coolant inlet and a coolant outlet, the first coolant tank between the coolant inlet and the coolant outlet being divided into a coolant inlet part and a coolant outlet part by means of a baffle being arranged to direct the coolant flow from said coolant inlet part along corrugated turbulators to said second coolant tank, from where the coolant flow is to follow the corrugated turbulators to said coolant outlet part.

15. Heat exchanger according to claim 1, wherein said first coolant tank has a coolant inlet and a coolant outlet, the first coolant tank between the coolant inlet and the coolant outlet being divided into a coolant inlet part and a coolant outlet part by means of a baffle being arranged to direct the coolant flow from said coolant inlet part along corrugated turbulators to said second coolant tank, from where the coolant flow is to follow the corrugated turbulators to said coolant outlet part.

16. Heat exchanger according to claim 15, wherein the sheet material of the corrugated turbulators has an embossed offset pattern enhancing turbulent flow of the coolant.

17. Heat exchanger according to claim 1, wherein said first coolant tank has a coolant inlet and a coolant outlet, the first coolant tank between the coolant input and the coolant output being divided into a coolant inlet part, a second coolant deviation part and a coolant outlet part and the second coolant tank being divided into a first coolant deviation part and a third coolant deviation part by means of three baffles, the first baffle in the first coolant tank being arranged to direct the coolant flow from said coolant inlet part along corrugated turbulators to said first coolant deviation part, the second baffle in the second coolant tank being arranged to direct the coolant flow along the corrugated turbulators to said second coolant deviation part, and the third baffle in the first coolant tank being arranged to direct the coolant flow along the corrugated turbulators to said third coolant deviation part, from where the coolant flow is to follow the corrugated turbulators to said coolant outlet part.

18. Heat exchanger according to claim 1, wherein the cowling have flanges, and the header plate and flanges of the cowling form a close fitment holding the brazable heat exchanger parts assembled while being brazed.

19. Method of producing a heat exchanger according to claim 1, said heat exchanger comprising a coolant housing, comprising the steps of:
   assembling all of the brazable parts to a unit,
   brazing of said unit by heating thereof in a furnace, and
   welding of at least one side wall to said unit in order to enclose said coolant housing.

20. Method according to claim 19, wherein while brazing said unit is held together by means of a fixture frame.

21. Method according to claim 19, wherein while brazing said unit is held together by close fitment of flanges on some of the brazable parts.

* * * * *